United States Patent [19]

Watanabe et al.

[11] Patent Number: 4,747,148
[45] Date of Patent: May 24, 1988

[54] METHOD OF IDENTIFYING OBJECTS

[75] Inventors: Yuji Watanabe; Toshiaki Kondo, both of Hirakata, Japan

[73] Assignee: Kabushiki Kaisha Komatsu Seisakusho, Tokyo, Japan

[21] Appl. No.: 598,379

[22] Filed: Apr. 9, 1984

[30] Foreign Application Priority Data

Apr. 11, 1983 [JP] Japan .................................. 58-63370
Apr. 27, 1983 [JP] Japan .................................. 58-74464
May 4, 1983 [JP] Japan .................................. 58-78792
May 11, 1983 [JP] Japan .................................. 58-82394

[51] Int. Cl.$^4$ ............................................. G06K 9/00
[52] U.S. Cl. ..................................... 382/10; 358/101; 382/8; 382/18; 382/48; 382/42
[58] Field of Search ................. 901/46, 47; 382/8, 10, 382/18, 48, 1, 34, 42; 364/468; 358/101; 356/384, 385, 387, 394

[56] References Cited

U.S. PATENT DOCUMENTS

| 3,566,080 | 2/1971 | Uffelman et al. | 382/44 |
| 4,173,788 | 11/1979 | Latiotis | 356/387 |
| 4,441,205 | 4/1984 | Berkin et al. | 382/18 |
| 4,442,544 | 4/1984 | Moreland | 382/53 |

OTHER PUBLICATIONS

Article entitled "Robot Picks Parts Out of a Bin" from *Electronics*, Nov. 30, 1982, p. 50.

Primary Examiner—David K. Moore
Assistant Examiner—J. Couso
Attorney, Agent, or Firm—Spensley Horn Jubas & Lubitz

[57] ABSTRACT

A plurality of objects are identified by the steps of preparing a reference pattern B comprising picture image data of a predetermined number and representing the brightness relating to the configuration of the objects; extracting a brightness pattern A comprising a predetermined number of picture image data among picture image data in a predetermined field of view in which the objects presents; and determining the correlation between the reference pattern B and the brightness pattern A so as to judge as to whether the brightness pattern A is the brightness pattern related to the configuration of the objects. When determining the correlation, average values of respective patterns are subtracted respectively from the brightness pattern and the reference pattern to obtain patterns A' and B' obtained by converting then in connection with deviations from the average values. A pattern A" is obtained by normalizing pattern A' and the inner products of patterns A" and B' and of patterns A' and B' are determined. These two inner products are used as a reference value for identifying the objects.

7 Claims, 12 Drawing Sheets

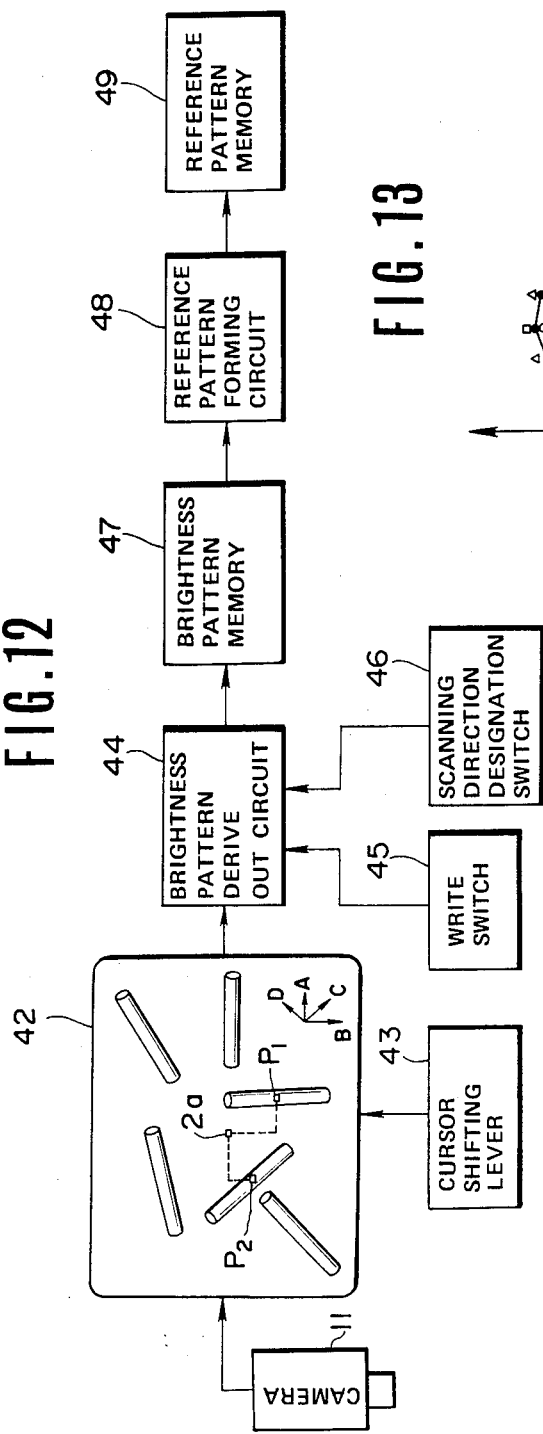
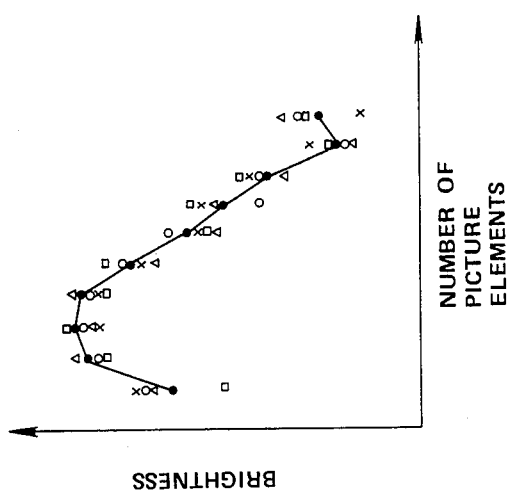

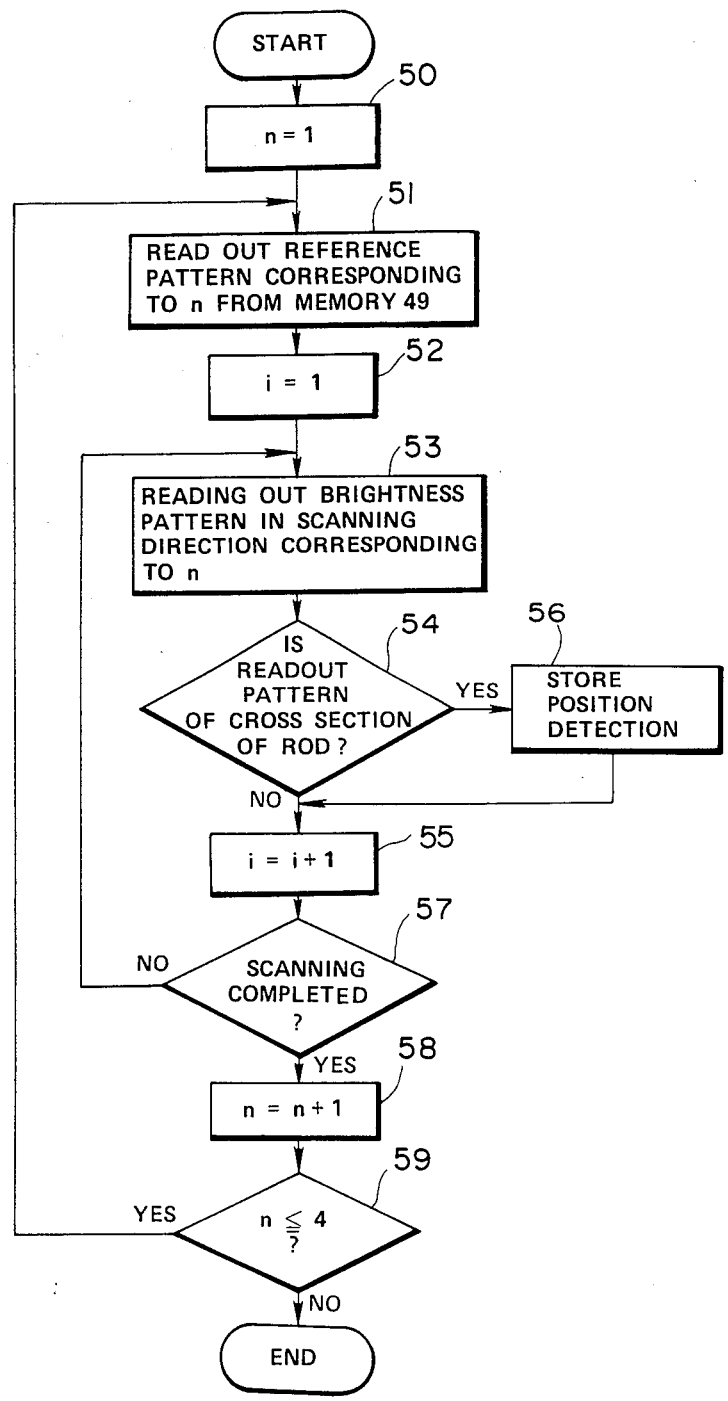

METHOD OF IDENTIFYING OBJECTS

BACKGROUND OF THE INVENTION

1. Field of Invention

This invention relates to a method of identifying an object to be detected from image data comprising one picture.

2. Description of the Prior Art

According to a prior art method of identifying an object to be detected (hereinafter, merely called an object) the object is photographed with an image pickup device of an industrial television camera for example, the photographed picture is scanned, and a bright and dark pattern (brightness pattern) comprising image data of a predetermined number which are continuous in the direction of scanning is compared with a reference pattern which has been prepared previously and representing the brightness of the object. With this method, however, in spite of the fact that the picture is inputted with multistage tones, the actual processing of the data is made after converting the data into binary codes, such method is practical where electrical component parts can be assembled under satisfactory optical environment and high quality binary picture image can be obtained relatively readily. However, if a special light source for image pick-up is not available so that the object is photographed under the influence of solar light, as the brightness pattern of the object varies greatly, correct identification of the pattern is impossible. Furthermore, background and noise may cause erroneous identification.

In the method of identifying an object by comparison of patterns, where the objects are arranged in a predetermined direction, for example substantially perpendicularly to the direction of scanning, detection is possible, but the objects such as rods or logs 10 are randomly distributed as shown in FIG. 1, it has been impossible to detect the object in all directions. Furthermore, as in a factory in which directions of illumination are not uniform so that brightness is influenced by solar light, the brightness pattern in the cross-sectional direction varies according to the direction of the object. For this reason, detection of objects which are randomly directed is very difficult.

Furthermore, according to the method of identifying the objects by comparing patterns, identification is made by judging whether or not an evaluation value representing the similarity of both patterns exceeds a threshold value set for the evaluation value, but where the evaluation value varies greatly in accordance with the size of the object, it is impossible to exactly evaluate the evaluation value even when the threshold value is set to an optimum value.

For example, let us consider a case wherein rods 10 are photographed with a industrial television (ITV) camera and $4 \times 16 = 64$ picture elements (see FIG. 2) are obtained from the image information thus obtained. A graph as shown in FIG. 3 can be obtained by determining an evaluation value utilizable as an index representing the cross-section of the rod from four picture elements comprising the cross-section of the rod and then depicting the evaluation value along the longitudinal direction of the rod. As can be noted by the comparison of FIGS. 2 and 3, when the central portion of the rod becomes dark due to stain or spoil thereof, the evaluation value would vary greatly at such portion.

Where a definite threshold value $Y_0$ is set as shown in FIG. 3, the region exceeding this threshold value would be cut by the dark portion of the rod, thus resulting in an erroneous evaluation of the length of the rod.

According to another prior art method of identification, a contour of an object whose brightness varies quickly is determined from binary encoded picture data obtained by an ITV camera so as to precisely detect the object.

According to this method, a high quality picture image can be obtained but where the objects (rods) contact or overlap with each other as shown in FIG. 4, extraction of the contour of the rods 10 with binary encoding is difficult. Accordingly, it is difficult to detect proper rods (in this case, rods 10a and 10b on which other rods do not overlie so that they can be handled with a handling robot).

SUMMARY OF THE INVENTION

It is an object of this invention to provide a novel method of identifying objects which is capable of correctly identifying a proper object even under an adverse optical environment or in a state in which the objects are in contact with each other or are distributed randomly.

According to this invention, there is provided a method of recognizing objects characterized by comprising the steps of extracting a brightness pattern A $(Ca_1, Ca_2, \ldots, Can)$ including n picture image data from picture image data in a predetermined field of view in which a plurality of objects to be detected are present; determining an average value $\overline{Ca}$ from said brightness pattern by using an equation $$\overline{Ca} = \sum_{i=1}^{n} Ca\ i/n;$$

determining a pattern A' $(C'a_1, C'a_2, \ldots, C'an)$ obtained by converting the brightness pattern in connection with a deviation from the average value according to an equation $C'ai = Cai - \overline{Ca}$; determining a pattern A'' $(C''a_1, C''a_2, \ldots, C''an)$ obtained by normalizing the pattern A' according to an equation $$C'ai = \frac{Ca_1}{\sqrt{\sum_{i=1}^{n}(Cai)^2}}$$

preparing a reference pattern B $(Cb_1, Cb_2, \ldots, Cbn)$ comprising picture image data representing n brightnesses relating to configurations of objects to be determined; determining a pattern B' obtained by converting the reference pattern B in connection with a deviation from the average pattern of the reference pattern B; calculating inner products of the patterns A'' and B' and the patterns A' and B', and identifying the objects by using the products as an evaluation value.

There is also provided a method of identifying objects characterized by the steps of sequentially extracting a brightness pattern including a predetermined number picture element data which are continuous in a predetermined scanning direction from picture element data in a predetermined field of view in which a plurality of the objects to be identified are scattered while shifting the brightness pattern by one picture element in the scanning direction; comparing the brightness pattern with a prepared reference pattern representing brightnesses of a predetermined number of picture elements in a cross-sectional direction of the objects; where the brightness pattern in the cross-sectional direction of the objects varies in accordance with the directions of the objects, preparing brightness patterns in the cross-sectional direction of the objects presenting substantially perpendicularly to the horizontal, vertical, right 45° upper and right 45° lower directions in the predetermined field of view, in each of the four directions; extracting brightness patterns in each of four scanning directions of the horizontal, vertical, right 45° upper and right 45° lower directions in the field of view, from the picture image data in the predetermined field of view; and utilizing one of the prepared four brightness pattern selected in accordance with the direction of scanning of the brightness pattern as a reference pattern utilized as a reference for comparison of the brightness pattern, thereby identifying scattered objects.

According to another aspect of this invention there is provided a method of identifying objects, characterized by comprising the steps of preparing a reference pattern representing brightnesses of a predetermined number of picture elements in a cross-sectional direction of the objects, the reference pattern being picture image data of the objects having a uniform cross-sectional configuration for the length of a predetermined section thereof; sequentially extracting a brightness pattern of a predetermined number of picture elements which present continuously in the X direction of rectangular coordinates from picture image data in a predetermined field of view in which the objects present while shifting the brightness pattern by one picture element in the X direction; detecting a time at which the objects are crossed in accordance with the brightness pattern and the reference pattern; after detecting said time, extracting three brightness patterns of a predetermined number of patterns regarding a first position displaced by one picture element on the positive side in the Y direction of the rectangular coordinates with reference to a reference position corresponding to a position at which the cross-section of the objects is detected, the first position being displaced by one picture element on the negative side in the X direction with respect to the reference position, a second position same as the reference position and a third position displaced by one picture element on the positive side with reference to the reference position; selecting a brightness pattern mostly resembling the reference pattern among the three brightness patterns; judging whether the selected brightness pattern is the brightness pattern or not when the objects are crossed based on the selected brightness pattern and the reference pattern; extracting the three brightness patterns by using the position of the selected brightness pattern as a new reference position when the brightness pattern is a pattern at the time of crossing the objects; repeating the judgment; storing the reference position of a brightness pattern when the same is not the brightness pattern at the time of crossing; processing the negative side in the Y direction by using a position at which the crossing is detected as a reference position in the same manner as on the positive side in the Y direction; storing the reference position at which the pattern becomes the brightness pattern at the time of crossing the objects; determining a distance between the stored two reference positions; and identifying that a proper object presents when the distance corresponds to the length of the predetermined section of the objects.

According to still another aspect of this invention, there is provided a method of identifying objects, characterized by comprising the steps of: preparing a reference pattern representing brightnesses of a predetermined number of picture elements in a crosssectional direction of objects to be identified, the reference pattern being picture image data of the objects having uniform cross-sectional configuration for a length of a predetermined section thereof; extracting brightness patterns of a predetermined number of picture elements which present continuously in the X direction of rectangular coordinates from picture image data in a predetermined field of view in which the objects present while shifting the brightness patterns by one picture element in the X direction; detecting a crossing time of the objects in accordance with the brightness patterns and the reference patterns j tracing in the Y direction of the rectangular coordinates a position of crossing the objects by utilizing a crossing detection position as a reference position; and while tracing, setting a threshold value Yn regarding a given evaluation value yn among continuous groups of evaluation values representing a simalarity between the brightness patterns and the reference patterns as a function in which one or more evaluation values before the given evaluation value are variable, the threshold value having such relation that the threshold value Yn is smaller than a constant threshold value Y0 when the one or more evaluation values are larger than the constant threshold value Y0 preset for the groups of the evaluation values.

At the time of tracing and searching, where an evaluation value representing the similarity between the brightness pattern and the reference pattern exceeds continuously or greatly a threshold value set for the evaluation value the fact that the succeeding evaluation values exceeds the threshold value at a high probability is noted so as to vary the threshold value as a function of an already inputted evaluated value thereby avoiding erroneous evaluation of the evaluation value caused by noise.

BRIEF DESCRIPTION OF THE DRAWINGS

In the accompanying drawings:

FIG. 12 is a block diagram showing an electric circuit for forming a reference pattern;

FIG. 13 is a graph showing a plurality of brightness patterns and a reference pattern prepared therefrom;

FIG. 16 is a flow chart showing one example of the steps of the method of identifying objects by using the four reference patterns described above.

DESCRIPTION OF THE PREFERRED EMBODIMENT:

The invention will now be described in detail with reference to the accompanying drawings.

Figure 1:
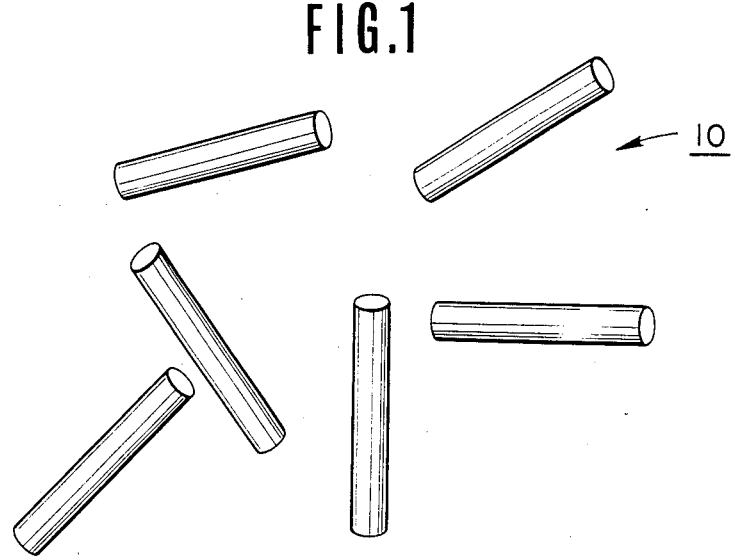
FIGS. 1, 4 and 5 are plan views showing rods randomly distributed or arranged neatly.
Figure 2:
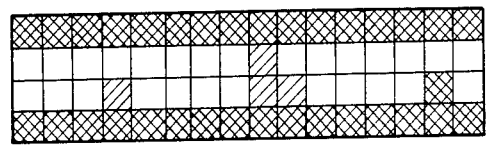
FIG. 2 is a graph showing picture elements showing one example of the brightness of a rod.
Figure 3:
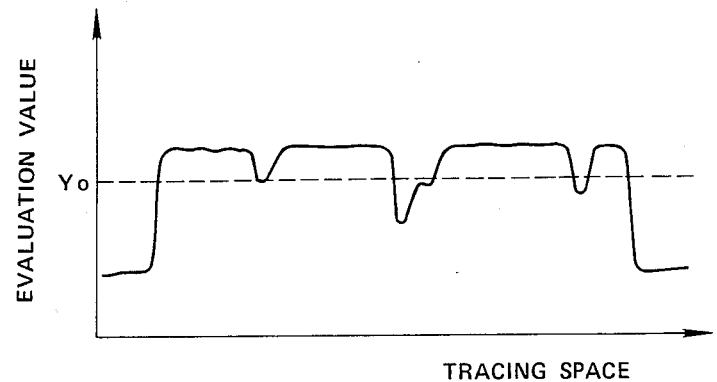
FIG. 3 is a graph showing the relationship between evaluation values obtained from the picture elements shown in FIG. 2 and a conventional threshold value.
Figure 4:
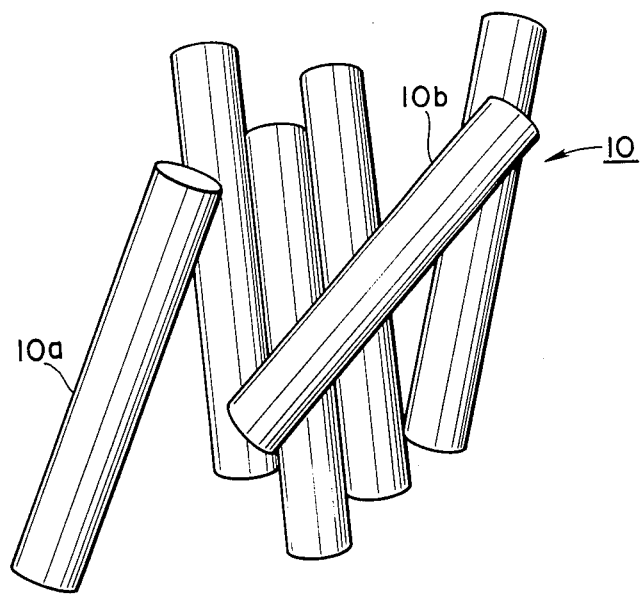
Figure 5:
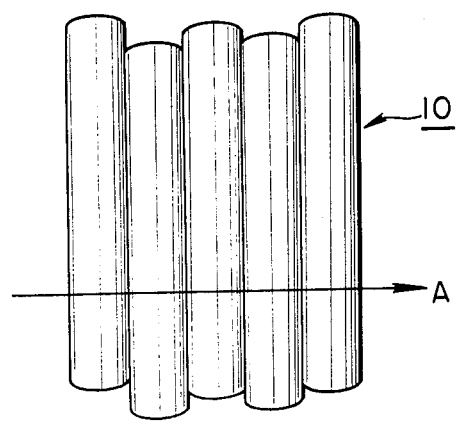
Figure 6:
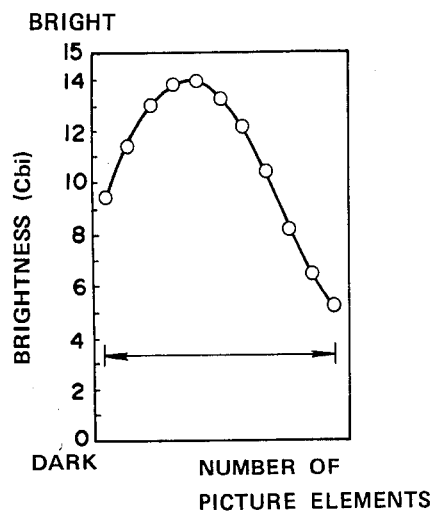
FIG. 6 is a graph showing one example of a reference pattern representing the brightness of rod in the cross-sectional direction thereof

At first, the principle of the method of identifying an object of this invention by comparing two patterns will be described. Let us consider rods 10 as shown in FIG. 5 as the objects to be detected. A reference pattern as shown in FIG. 6 representing the brightness Cbi in the cross-sectional direction of the rods 10 when they are photographed is prepared beforehand. The brightness Cbi is represented in 16 tones.

Figure 7:
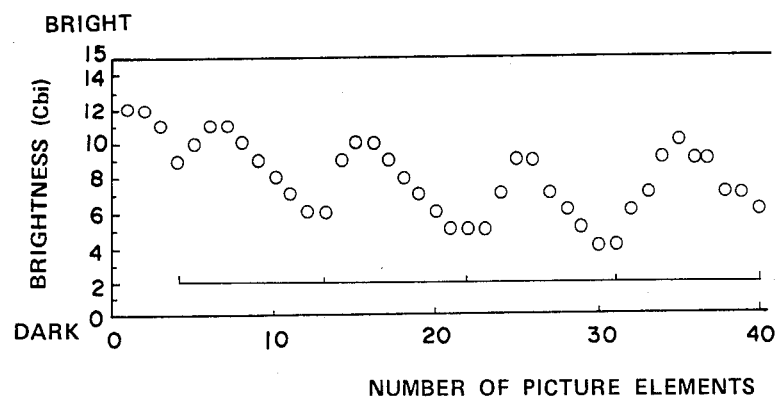
FIG. 7 is a graph showing one example of the brightness when the rods shown in FIG. 5 are scanned in the direction of arrow A.

When the brightness Cai of picture elements continuously present in direction A shown in FIG. 5 is detected, a graph shown in FIG. 7 can be obtained. As shown in FIG. 6 since the diameter of each rod corresponds to the width of 10 picture elements, it is possible to judge whether a rod 10 is present or not by comparing the brightness pattern having a brightness Cai of 10 picture elements picked up from elements continuously present in the direction of arrow A with the reference pattern.

Generally, a pattern represented by n values can be considered to correspond to one point in a nth dimentional space, so that whether two patterns (the brightness pattern and the reference pattern) resemble or not can be represented by the distance between two points in that space. However, it can be considered that the brightness shown in FIG. 7 parallelly moves in the vertical direction or expands or contracts in the longitudinal direction due to the variation in the illumination light source for the rods 10. For decreasing the effect of variation of the illumination, let us determine a pattern A' (C'a$_1$, C'a$_2$, ..., C'a$_n$) obtained by converting the pattern in connection with a deviation from the average value of a brightness pattern A (Ca$_1$, Ca$_2$, ..., Ca$_n$) by taking into consideration that $\overline{Ca}$ and Ca$i$ are expressed by the following equations (1) and (2)

$$\overline{Ca} = \sum_{i=1}^{n} Cai/n \tag{1}$$

$$C'ai = Cai - \overline{Ca} \tag{2}$$

A pattern A" (C"a$_1$, C"a$_2$, ..., C"a$_n$) obtained by normalizing the pattern A' can be expressed by the following equation $$C''ai = \frac{C'ai}{\sqrt{\sum_{i=1}^{n} (C'ai)^2}} \tag{3}$$

In the same manner, a pattern B' (C'b$_1$, C'b$_2$, ..., C'b$_n$) obtained by converting the pattern in connection with deviation from an average value of a reference pattern B Cb$_1$, Cb$_2$, ..., Cb$_n$) and a pattern B" obtained by normalizing the pattern B' are determined.

Figure 8:
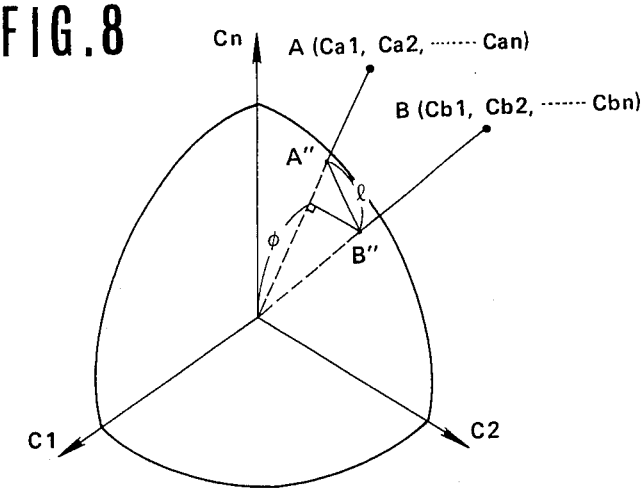
FIG. 8 is a graph showing a relative relation between two patterns in the nth space.

FIG. 8 shows patterns A" and B" in the nth dimentional space. The spherical surfaces shown in FIG. 8 show unit spheres. The similarity of these two patterns are shown by the distance l between the patterns A" and B". By denoting the length when pattern B" is projected on pattern A" by $\phi$, the distance l can be shown by the following equation (4)

$$l = \sqrt{2(1 - \phi)} \tag{4}$$

On the other hand, $\phi$ is given by $$\phi = (A'' \cdot B'') \tag{5}$$

$$= \frac{\sum_{i=1}^{n} C'ai \cdot C'bi}{\sqrt{\sum_{i=1}^{n} (C'ai)^2 \cdot \sum_{i=1}^{n} (C'bi)^2}} \tag{6}$$

As can be noted from equation (4) since there is a definite relation between l and $\phi$, $\phi$ too is a value related to the similarity of two patterns. When two patterns coincide perfectly, $\phi = 1.0$, when they are quite different, $\phi = 0$ and when they have the same configuration but having opposite polarities, $\phi = -1.0$. This is a value having the same meaning as a correlation coefficient Rfg($\tau$) utilized in a time series analysis $$Rfg(\tau) \frac{\int_{-\infty}^{\infty} f(t) \cdot g(t - \tau)dt}{\sqrt{\int_{-\infty}^{\infty} \{f(t)\}^2 dt \cdot \int_{-\infty}^{\infty} \{g(t - \tau)\}^2 dt}} \tag{7}$$

Hereinafter $\tau$ is called the pattern similarity. Let us judge similarity between the reference pattern and the brightness pattern by using this pattern similarity.

Figure 9:
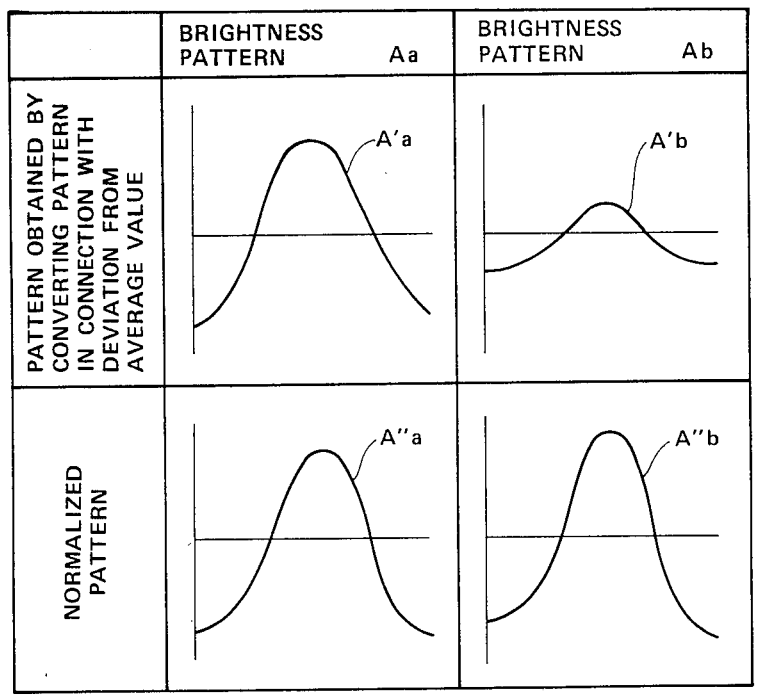
FIG. 9 is a graph showing two patterns having the same similarity but having different configurations.

Even for the same similarity, there exists two patterns having different configurations. FIG. 9 shows the relationship between patterns A'a and A'b obtained by converting the pattern in connection with a deviation from average values of different brightness patterns Aa and Ab and patterns A"a and A"b obtained by normalizing patterns A'a and A'b. As can be clearly understood from FIG. 9, even when the brightness patterns A'a and A'b obtained by converting the patterns in connection with deviation from the average values thereof are different when the difference is caused by an increase or decrease the brightness patterns become equal to the normalized patterns A"a and A"b with the result that the similarities between these patterns and the reference pattern become the same. To identify them, according to this invention, an evaluation value termed pattern strength is used.

The pattern strength Φ can be expressed by the following equation (8)

$$\Phi = (A' \cdot B'') \qquad (8)$$

$$= \frac{\sum_{i=1}^{n} C'ai \cdot C'bi}{\sqrt{\sum_{i=1}^{n} (C'bi)^2}} \qquad (9)$$

As can be noted from equations (6) and (9) the pattern strength Φ is obtained by multiplying the pattern similarity φ with $$\sqrt{\sum_{i=1}^{n} (C'ai)^2}$$

According to this method, the similarity between the reference pattern and the brightness pattern is judged by using two evaluation values of the pattern similarity φ and the pattern strength Φ.

Figure 10:
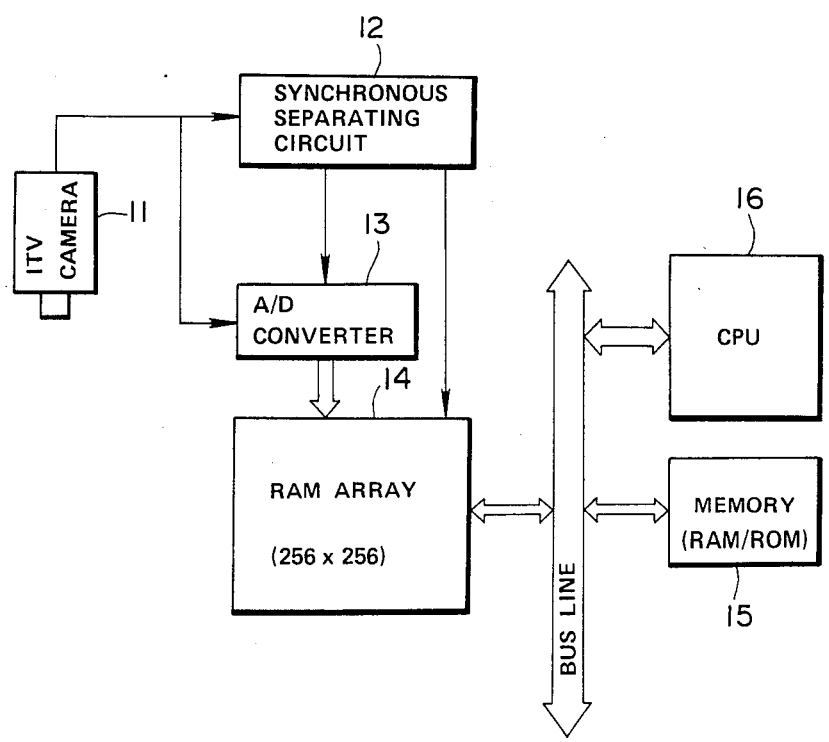
FIG. 10 is a block diagram showing one example of an apparatus utilized for carrying out the method of this invention.

FIG. 10 is a diagrammatic block diagram showing one example of apparatus utilized for carrying out the method of this invention. In FIG. 10, an ITV camera 11 photographs, with a predetermined field of view, rods 10 scattered on the floor of a factory, for example, as shown in FIG. 5, and outputs a video composite signal containing a brightness signal of its input picture image to a synchronous separating circuit 12 and an A/D converter 13. The synchronous separating circuit 12 separates a synchronizing signal from the video composite signal inputted thereto for designating an address of a random access memory array (RAM array) 14 based on the synchronizing signal. The A/D converter 13 converts the brightness signal of the input video composite signal into a picture image signal having 16 brightness tone steps, and writes the converted picture image signal into the designated address position. In this manner, the RAM array 14 stores the data of one picture in its 256×256 memory areas A memory device 15 is prestored with a convex reference pattern showing the brightness of a predetermined number of picture elements (in this example, 11) in the cross-sectional direction, the picture elements representing the picture image data of the rods 10, and a picture image processing program according to the method of this invention.

A central processing unit (CPU) 16 executes the processing of the picture image based on the picture image data stored in the RAM array 14 and the picture image processing program.

Figure 11:
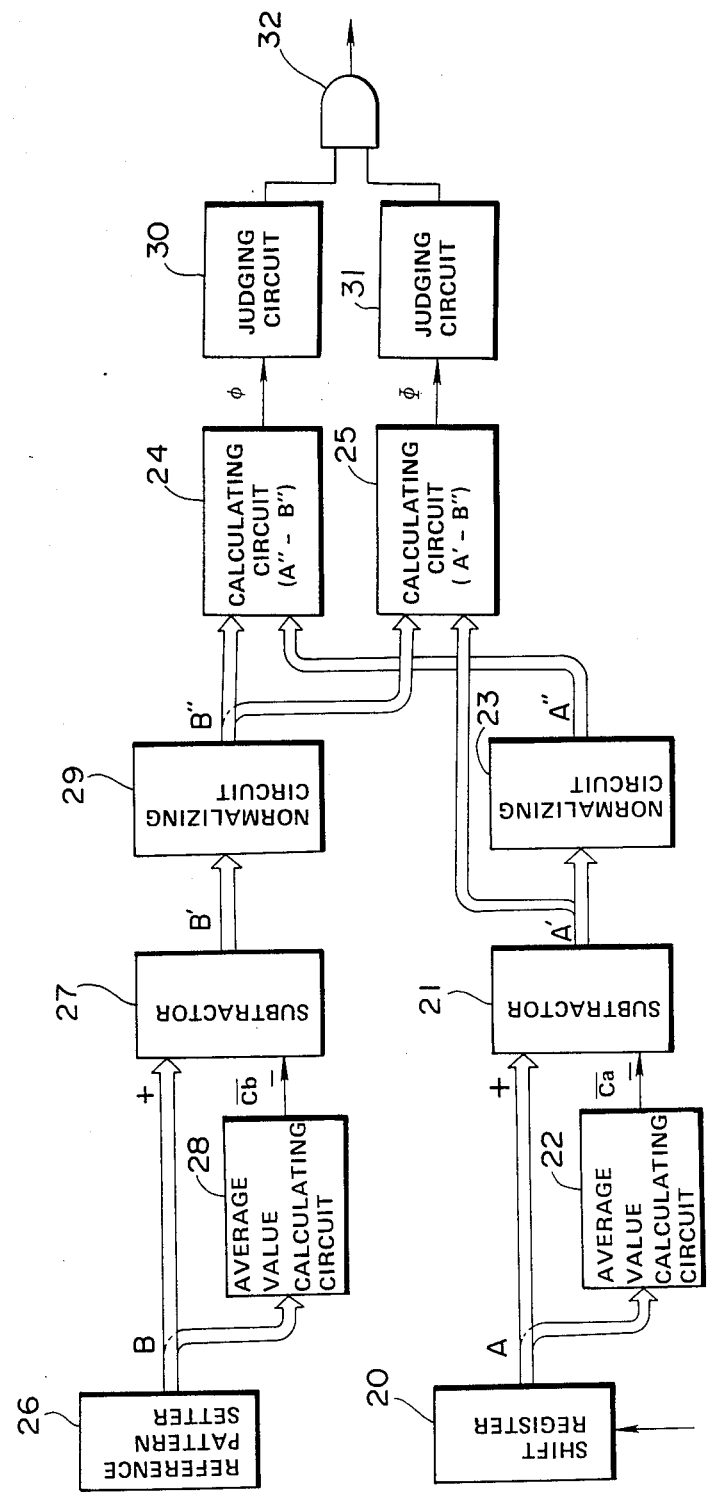
FIG. 11 is a block diagram showing a picture image processing circuit for identifying the cross-section of a rod based upon a reference pattern and a brightness pattern.

FIG. 11 is a block diagram for processing the picture image identifying the cross-section of the rod 10 by using two patterns. In FIG. 11, image data are sequentially applied to a shift register 20 from the RAM array 14 shown in FIG. 10. The shift register 20 includes stages of the same number a that of the picture elements in the cross-section direction of a rod 10, and applies picture image data stored in each stage to a subtractor 21 and an average value calculating circuit as a brightness pattern A. A processing to be described hereinafter is executed between a time of inputting a new picture image state to the shift register and a time at which the brightness pattern is shifted by one picture element.

The average value calculating circuit 22 calculates the average value $\bar{C}a$ of the brightness pattern according to equation (1) and applies the average value thus calculated to the subtractor 21. The subtractor 21 executes the subtraction operation shown by equation (2) for converting the brightness pattern A into a pattern A' based on the deviation from its average value, and the converted pattern A' is supplied to a normalizing circuit 23 and a calculating circuit 25.

The normalizing circuit 23 normalizes the converted pattern with $$\sqrt{\sum_{i=0}^{n} (C'ai)^2}$$

as shown by equation (3) to supply the normalized pattern A" to the calculating circuit 24.

A reference pattern setter 26 is preset with a reference pattern B constituted by the brightness C'bi in the cross-sectional direction of the rod 10 as shown in FIG. 6 and this reference pattern B is applied to a subtractor 27 and an average value calculating circuit 28.

Similar to the subtractor 21, the subtractor 27 converts the reference pattern B into the average value $\bar{C}b$ calculated by the average value calculating circuit 28 to apply the converted pattern B' to a calculating circuit 24.

The calculating circuit 24 calculates the inner product of two normalized patterns A" and B" and the product is sent to a judging circuit 30 as a degree of similarity φ of the patterns. The judging circuit 30 is preset with a threshold value for judging the degree of pattern similarity for outputting a signal (at a high level) representing that when the inputted degree of pattern similarity φ exceeds its threshold value it means that the patterns are similar. As above described, since the degree of pattern similarity becomes 1.0 when the patterns are just equal, the threshold value becomes a value slightly smaller than 1.0.

The calculating circuit 25 calculates the inner products of pattern B" and pattern A' and outputs the product to the judging circuit 31 as the pattern strength φ. The judging circuit 31 is preset with a region for judging the degree of pattern similarity so that when the inputted pattern strength φ is included in that region the judging circuit 31 outputs an output signal (high level) showing that the pattern strength is optimum. Where the pattern strengths of the brightness pattern and the reference pattern are equal, the upper and lower limits of the region are set by taking a pattern strength Φ as a reference, the Φ satisfying the following condition in equation (8)

$$\Phi = (A' \cdot B'') = (B' \cdot B'') \qquad (10)$$

$$= \sqrt{\sum_{i=1}^{n} (C'bi)^2}$$

Instead of providing the region, the lower limit thereof may be used as a threshold value. Because, in many cases, when the brightness pattern becomes concave due to noise or the like so that the degree of pattern similarity exceeds the threshold value, the pattern strength at that time becomes smaller than the lower limit.

An AND gate circuit 32 is provided to produce a high level signal only when the output signals of the judging circuits 30 and 31 are both at the high level. When the AND gate circuit 32 produces the high level signal, it is judged that the reference pattern and the brightness pattern are similar and that a rod 10 presents.

Although in the foregoing description the degree of pattern similarity $\phi$ was determined with equation (6), the value of the term $$\sqrt{\sum_{i=1}^{n} (Cbi)^2}$$

in the denominator in equation (6) is a constant value related to the reference pattern so that when it is made to be 1, that is the value determined by $(A''\cdot B')$ also corresponds to the degree of pattern similarity. Accordingly, it is possible to use this value as the degree of pattern similarity. In this case, when two patterns coincide completely, the degree of pattern similarity takes a value shown in equation (11) so that it is necessary to determine the threshold value by taking this fact into consideration. In the same manner, although the pattern strength $\Phi$ was determined with equation (9), since the denominator of this equation is a constant value related to the reference pattern so that the value of the numerator of equation (9), that is the value determined by $(A'\cdot B')$ also corresponds to the pattern strength. As a consequence, it is possible to use this value as the pattern strength. It is also possible to select a suitable region by using the average value $\overline{Cb}$ of the reference pattern B obtained by the average value calculating circuit 28 as a reference and to add the judgment as to whether the average value $\overline{Ca}$ of the brightness pattern calculated with the average value calculating circuit is in the region or not to the judgment regarding the two evaluation values (degree of pattern similarity $\phi$ and the pattern strength $\Phi$).

A method of preparing the reference pattern and a method of extracting the brightness pattern will now be described.

According to this invention, four reference patterns are prepared and a reference pattern corresponding to the direction of extraction of the brightness pattern (scanning direction) is used.

In FIG. 12, when the ITV camera 11 photographs rods 10 scattered on the floor of a factory, a monitor 42 displays a picture of the plurality of rods in response to the image data sent from the ITV camera 11. Further, the monitor 42 displays a cursor 2a free to move in the vertical and horizontal directions of the monitor picture by the manipulation of a cursor shifting lever 43.

A brightness pattern derive out circuit 44 is provided for deriving out a brightness pattern comprising the picture image data comprising continuous 10 picture elements from the image data inputted to the monitor 42. More particularly, the derive out circuit 44 derives out a brightness pattern in a scanning direction designated by a scanning direction designation switch taking the shifted position of the cursor 2a as a reference when a write switch 45 is closed. The scanning direction designation switch 46 is constructed to designate either one of the horizontal direction (shown by arrow A), the vertical direction (shown by arrow B), right 45° upper direction (shown by arrow C) and right 45° lower direction (shown by arrow D).

A brightness pattern memory device 47 temporarily stores a plurality of brightness patterns derived out by the brightness pattern derive out circuit 44, while a reference pattern forming circuit 48 forms an optimum reference pattern from the plurality of brightness patterns. As the method of forming the reference pattern from the plurality of brightness patterns, may be used a method using Lagrage's method of indefinite multipliers or a method for obtaining an average value or a center value.

The reference pattern prepared in this manner is stored in a memory area of the reference pattern memory device 49 corresponding to the direction of scanning designated by the scanning direction designation switch 46.

To prepare the reference pattern, either one of the four scanning directions, for example, the horizontal direction shown by arrow A is selected by operating the scanning direction designation switch 46. While viewing the picture on the monitor 42, the operator searches a picture image of the rod in a direction substantially perpendicular to the direction A and then manipulates the cursor shifting lever 43 to shift the cursor to the central position $P_1$ of the picture. Thereafter, the operator turns ON the write switch 45. By repeating many times the operation described above, a plurality of sets of the brightness patterns in the cross-sectional direction of the rod substantially perpendicular to the direction A would be stored in the brightness pattern memory device 47, and the reference pattern is formed by the reference pattern forming circuit 48 based on the plurality of sets of the brightness patterns. FIG. 13 shows the relationship among 4 sets of brightness patterns shown by symbols, ( , , $\Delta$ and x and the reference pattern (·) prepared from these brightness patterns.

Where direction D is designated as the scanning direction, a reference pattern in this scanning direction can be prepared by shifting the cursor 2a to the center position $P_2$ of the rod perpendicular to the designated direction.

Figure 14:
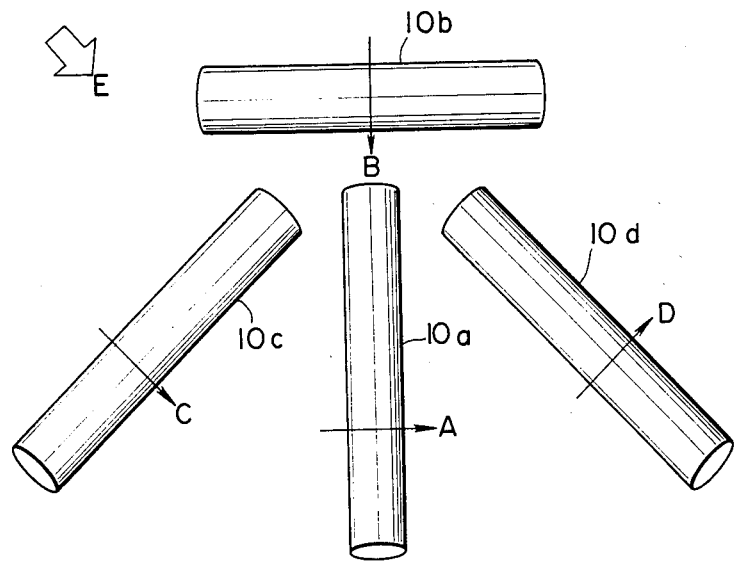
FIG. 14 is a diagrammatic representation of four rods respectively extending in directions orthogonal to four directions of scanning and one example of directions of illumination for these logs.
Figures 15A, 15B:
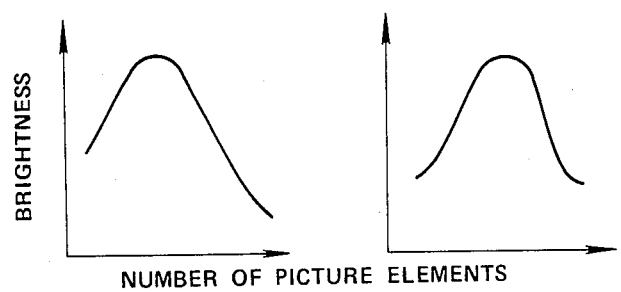
FIGS. 15a–15d are graphs showing one example of reference patterns prepared for respective rods 10a–10d shown in FIG. 14.
Figures 15C, 15D:
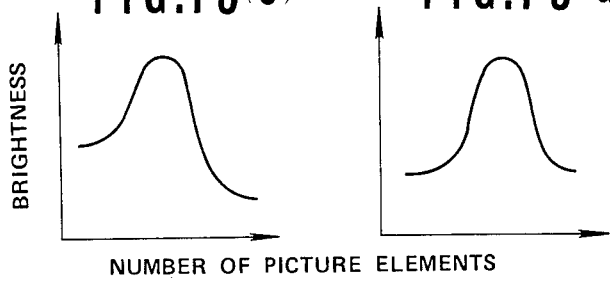

As above described, the reference pattern memory device 49 stores four reference patterns corresponding to the four scanning directions.

Where rods 10a, 10b, 10c and 10d present respectively in the orthogonal directions A, B, C and D as shown in FIG. 14, and when the rods are illuminated in the direction of arrow E, the reference patterns formed for rods 10a, 10b, 10c and 10d would have different patterns as shown in FIGS. 15a–15d.

One example of the method of identifying an object by using the four reference patterns will be described in the following with reference to a flow chart shown in FIG. 16. At step 50 it is made n =1 to designate the scanning direction of the picture image data of one picture. Then at step 51 a reference pattern corresponding to n is read out from the reference pattern memory device 49. As above described, the reference pattern memory device 49 is constructed to store reference patterns in the four scanning directions so that the reference patterns can be read out according to the value of n.

Then at step 52 it is made i=1 for designating the position of one end of the scanning direction corresponding to n. At step 53, the brightness pattern of the data of a predetermined number which are continuous in the scanning direction which corresponds to n are read out from the picture image data of one picture corresponding to the position of i. At step 54, the brightness pattern is compared with the read out reference pattern to judge whether the read out brightness pattern is the brightness pattern of the cross-section of the rod or not. When the result of judgment is NO, at step 55 the position of the rod is detected based on the position of i when the brightness pattern is that of the cross-section and to store this position. When the result of judgment at step 54 is YES, the program is transferred to step 56 to store position detection. At step 55, 1 is added to i, and at step 57 a judgment is made as to whether the position of i is the scanning completion position or not. If the result of this judgment is NO, the program is returned to step 53 at which a new brightness pattern displaced by one picture element in the scanning direction corresponding to n is read out. By executing the processings and judgments until completion of a scanning, it is possible to detect and store the cross-sectional position of a rod presenting within ±22.5° about a direction orthogonal to the direction of scanning corresponding to n. When the position is the scanning completion position, 1 is added to n to designate another scanning position at step 58.

At step 59, a judgment is made as to whether the detection of rods in each of the four scanning directions has been executed or not. When n is less than 4, the program is returned to step 51. At this time, at step 51, a new reference pattern is read out from the reference memory device corresponding to the renewed value of n. Thereafter, the scanning is made in a scanning direction corresponding to n by using the read out reference pattern for detecting the cross-sectional position of the rod in the same manner as above described. When detection of the rod in each of the four scanning directions completes, n becomes 5 thus ending the detection of rods of one picture.

As above described, presence or absence (cross-sectional position) of a plurality of rods scattered in all directions can be detected.

The procedures of processing a picture image after the cross-sectional positions of rods have been detected will be described as follows with reference to the content of the RAM array 14 (FIG. 10) shown in FIG. 17 and a flow chart shown in FIG. 18.

Figure 17:
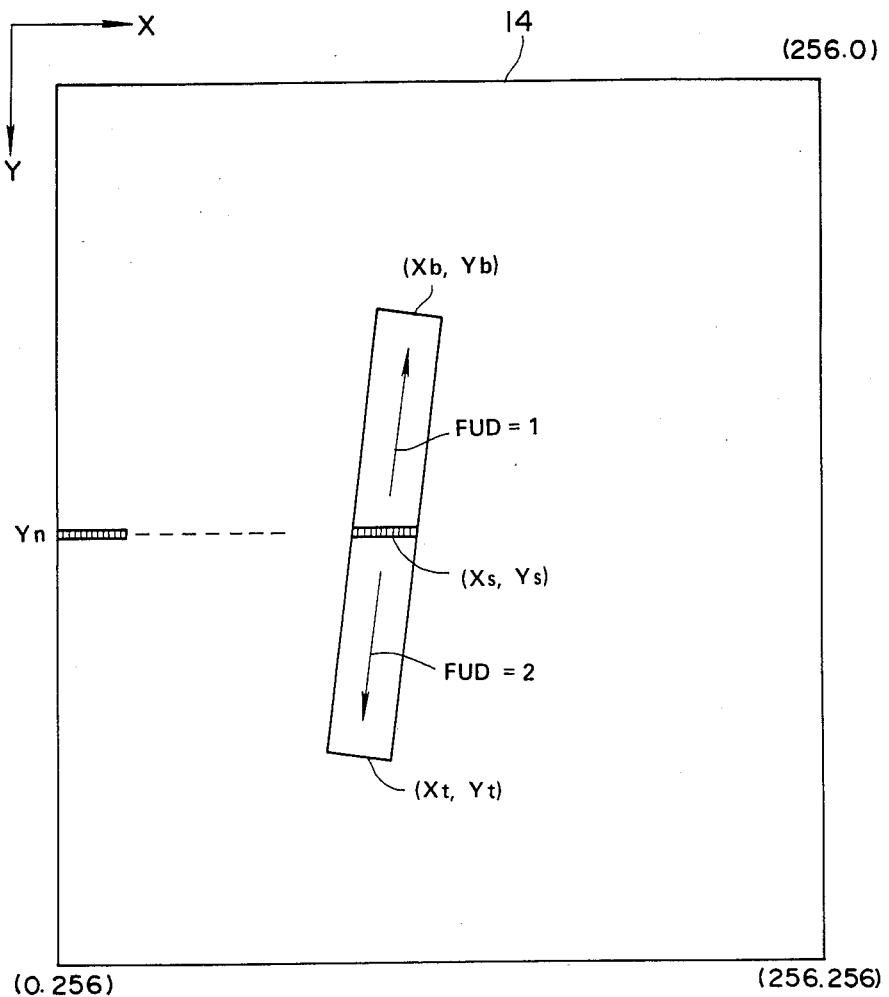
FIG. 17 shows one example of a memory area of a RAM array shown in FIG. 10 and a picture element data stored in the area.
Figure 18:
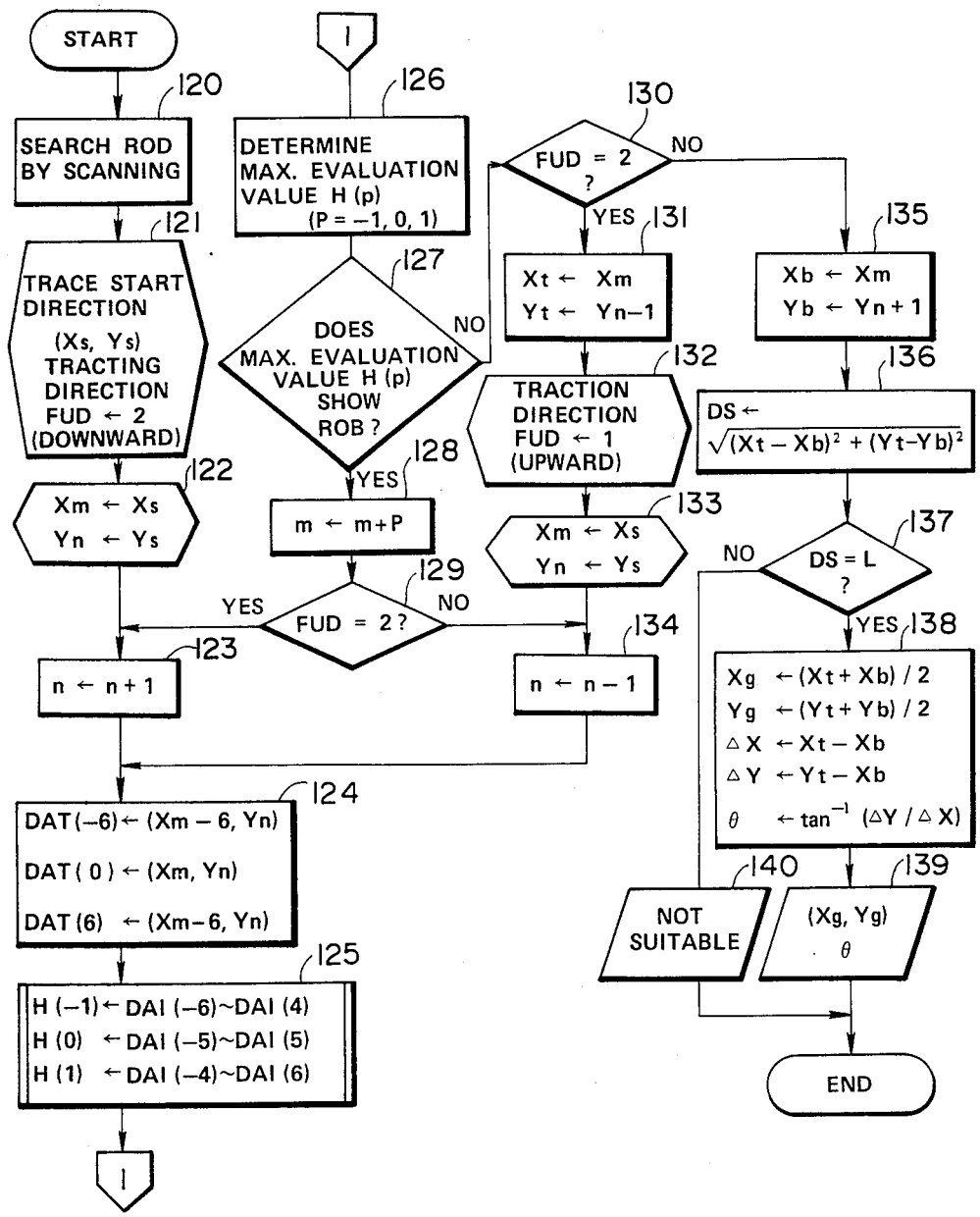
FIG. 18 is a flow chart useful to explain one example of the picture image processing in a case where the cross-sectional position of a rod is traced.

As shown in FIG. 17, a brightness pattern comprising a group of image data of 11 picture elements is extracted from 11 address positions located continuously in X direction from a position Yn in direction Y of the RAM array 14. By comparing this brightness pattern with a reference pattern prestored in the memory device 15, a judgment is made whether the brightness pattern is the brightness pattern of the cross-section of a rod 10 or not. This judgment has been described in detail with reference to FIG. 11. When the brightness pattern is not that of the cross-section, the brightness pattern is again extracted from 11 address positions displaced by one picture element in X direction to execute the judgment described above. In this manner, the RAM array 14 is scanned in X direction to search the rod 10 at step 120 shown in FIG. 18.

Upon detection of the cross-section of the rod 10, the center position (Xs, Ys) of 11 address positions is stored as the trace start position of the rod 10 and the direction of trace from the trace start position is designated as a down direction (positive Y direction by writing 2 in a Flag FUD showing scanning direction (up or down) at step 121 thus selecting the start position (Xs, Ys) as the reference position Xm, Yn at step 122.

Then at step 123, the reference position (Xm, Yn) is displaced by one picture element in the positive Y direction, and at step 124 a picture image data DAT (−6)—DAT (6) are derived out from continuous 13 address positions (Xm−6, Yn)−(Xm+1, Yn) about the displaced reference position. At step 125, evaluation values H(−1), H(0) and H(1) respectively representing the degrees of approximation of the reference pattern with respect to three brightness patterns of DAT (−6)−DAT (4), DAT (−5)−DAT (5) and DAT (−4)−DAT (6) respectively are determined. The address positions in the X direction and at the center positions of these 3 brightness patterns are respectively displaced by one picture element, on the negative side, zero picture element and one picture element on the positive side with reference to the reference position.

Then at step 126, the maximum evaluation value H (P) is determined among the three evaluation values H(−1) H(0) and H(1) determined in step 125, and at step 127 a judgment is made as to whether the maximum evaluation value H(P) shows the cross-section of the rod 10 or not.

When the result of judgment at step 127 is YES, at step 128, the shift quantity P in X direction (P=−1, 0 or 1) is added to m. Then at step 129, a judgment is made as to whether FUD=2, and when the result of this judgment is YES, the step 123 is executed again followed by steps 124, 125 and 126 in which the address position (Xm, Yn) having contents m and n thus obtained is used as a near reference position. The step 129 is provided to judge whether the tracing is to be made in the downward direction or not and in this example it selects a flow line to step 123.

Since the cross-section of the rod 10 is traced in this manner, even when the rod 10 is inclined at the maximum angle of 45° with respect to Y direction, it is possible to trace the cross-section of the rod 10.

When the trace is completed up to one end of the rod 10 and the result of the judgment at step 127 shows that the evaluation value H(P) does not show the cross-section of the rod 10, at step 130 a judgment is made as to whether FUD=2 or not. When the result of this judgment is YES, at step 131, the reference position (Xm, Yn−1) is stored as the address position (Xt, Yt) of one end of the rod 10.

Then at step 132, 1 is written into FUD to designate the direction of trace of the rod 10 to the upper direction (negative Y direction), and at step 133 the start position (Xs, Ys) is again set to the reference position (Xm, Yn).

Then at step 134, the reference position (Xm, Xn) is shifted by one picture element in the negative Y direction and the steps 124, 125 and 126 are executed based on the shifted reference position. Then at step 127, a judgment is made as to whether the maximum evaluation value H(P) represents the cross-section of the rod 10 or not.

When the result of judgment at step 127 is YES, a X direction shift quantity P(=−1, 0 or 1) is added to m at step 128. At step 129 a judgment is made again whether FUD=2 or not and when the result of judgment is 40, at step 134 1 is subtracted from n and then the steps 124, 125 and 126 are executed by using the address position (Xm, Yn) thus obtained as a new reference position.

When the tracing up to the other end of the rod 10 has completed, and when the result of judgment at step 127 is 40, at step 130 a judgment is made whether FUD=2 or not. When the result of this judgment is NO, at step 135 the previous reference position (Xm, Yn+1) is stored as the address position (Xb, Yb) of the other end of the rod.

When the address position (Xt, Yt) and (Xb, Yb) at both ends of the rod 10 are determined in a manner as above described, at step 136, the distance between the two positions is calculated and at step 137 a judgment is made as to whether the calculated distance DS is equal to distance L corresponding to the length of the rod 10.

When the result of judgment of step 137 is YES, it is judged that a proper rod exists and at step 138, the position of the center of gravity (Xg, Yg) and the inclination angle B of the rod are calculated to output data representing the position of the center of gravity and the inclination angle which were calculated previously, thus completing a series of processings of the picture image.

When distance DS does not coincide with distance L, it is judged that the rod 10 is not proper, and at step 139 a signal indicating that the rod is not proper is outputted, thus completing a series of processings of the picture image. Noncoincidence of distances DS and L occurs in such case while searching the rod by scanning in X direction when the crossing of the rod is erroneously detected due to noise so that trace is made in Y direction, when the rod is inclined at an angle larger than 45°, and when another rod is overlying one rod. Accordingly when a signal representing improper condition is issued, the scanning is made again in the X direction from the start position (Xs, Ys) to search the rod or the direction of scanning is changed and the ITV camera 11 is rotated over a predetermined angle for changing the input picture image and thereafter the same processings as above described are executed.

The data outputted from step 139 and representing the position of the center of gravity (Xg, Yg) and the inclination angle $\theta$ of the rod are applied to a handling robot, for example, so that the robot can correctly grasp the rod 10 according to the inputted data.

A method of determining a threshold value acting as a reference value for judging whether the evaluation value represents the cross-section of the rod or not, at the time of tracing the cross-section of the rod will now be described. The basic concept of the method of the threshold value will first be considered. A continuous evaluation value obtained by tracing the cross-section of the rod may continuously exceed a threshold value set to correspond to this evaluation value. When the evaluation value greatly exceeds the threshold value the probability in which the succeeding evaluation values exceed the threshold values is high.

In such case, the threshold value is set to be low. Then even when succeeding evaluation values contain noise, there is no fear of erroneous evaluation.

Let us denote continuous evaluation values by $y_1, y_2, \ldots, y_{n-1}, y_n, y_{n+1} \ldots$, and the threshold value corresponding to the evaluation value yn by $Y_n$.

According to this invention, the threshold value $Y_n$ is varied as a function of the evaluation value $y_{n-1}, y_{n-2} \ldots$ before an evaluation value $y_n$ according to the following equation $$Y_n = Y_0 + f(y_{n-1}, y_{n-2}, y_{n-3}, \ldots)$$

where $Y_0$ designates a constant. Thus, $Y_0$ is a constant threshold value suitably preset corresponding to evaluation values $y_1, y_2 \ldots$.

Where the threshold value $y_n$ is expressed as a linear combination of the evaluation values $y_{n-1}, y_{n-2}$, the following equation can be obtained.

$$Y_n = Y_0 + \sum_{i=1}^{n-1} a_{n-i} y_{n-1}$$

where coefficient $a_{n-1}$ is a weight representing the degree of contribution of the evaluation value $y_{n-1}$ before i for determining the threshold value. Usually, as i increases, the coefficient $a_{n-1}$ decreases. More particularly, as shown by the following equation (12) the threshold value $Y_n$ is made to decrease when the evaluation values $y_{n-1}, y_{n-2} \ldots$ are large.

$$Y_n = Y_0 - 0.8 y_{n-1} - 0.2 y_{n-2} \ldots \quad (12)$$

in which $a_{n-1}$ (i=1, 2 ... n−1) is used as the weight. However, the threshold value $Y_n$ has a positive lower limit value $Y_{min}$ so that where $Y_n < Y_{min}$ irrespective of equation (12) it is made that $Y_n = Y_{min}$.

In connectional computers, it is easy to process the threshold value $Y_n$ when it is determined nonlinearly and stepwisely in the presence of the evaluation values $y_{n-1}, y_{n-2} \ldots$ as shown by the following equations.

$$\begin{aligned}
Y_n &= 0.8Y_0; \quad 2Y_0 > y_{n-1} \geq Y_0 U 2Y_0 > y_{n-2} \geq Y_0 \\
&= 0.6Y_0; \quad y_{n-1} \geq 2Y_0 U y_{n-2} \geq 2Y_0 \text{ or} \\
&\quad 2Y_0 > y_{n-1} \geq Y_0 \cap 2Y_0 > y_{n-2} \geq Y_0 \\
&= 0.4Y_0; \quad y_{n-1} \geq 2Y_0 \cap y_{n-2} \geq 2Y_0 \\
&= Y_0; \quad \text{when } y_{n-1} \text{ and } y_{n-2} \text{ are on the outside of the range described above.}
\end{aligned} \quad (13)$$

Figure 19:
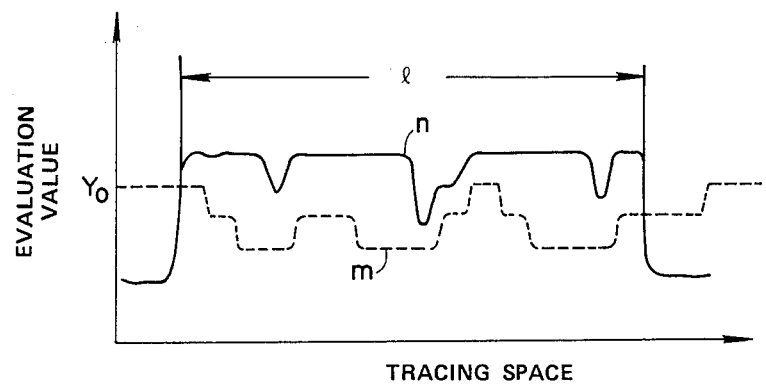
FIG. 19 is a graph showing the relationship between an evaluation value determined from the picture elements shown in FIG. 2, and the threshold value utilized in this invention.

The threshold value shown by dotted lines in FIG. 19 is obtained by varying it as above described with reference to the evaluation value shown by a solid line. By varying the threshold value in this manner, a region l (tracing distance) in which the evaluation value becomes larger than the threshold value becomes to correspond to the actual length of the rod.

Figure 20:
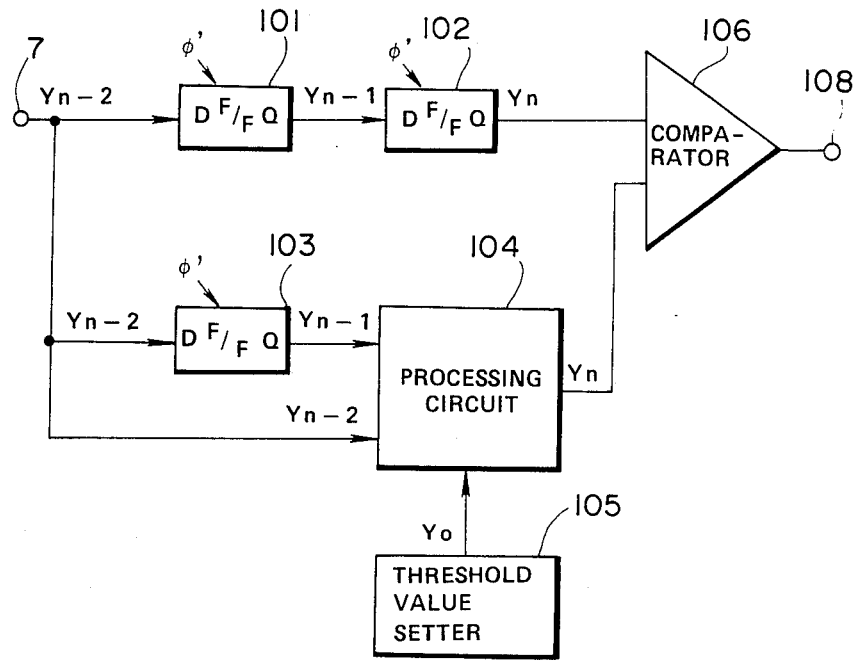
FIG. 20 is a block diagram showing one example of an electric circuit utilizing the method of determining the threshold value according to this invention.

FIG. 20 is a block diagram showing one example of the apparatus for carrying out the method of determining the threshold value according to this invention. The apparatus is constituted by delay flip-flop circuits 101, 102 and 103, a processing circuit 104, a threshold value setter 105 and a comparator 106.

Each of the flip-flop circuits 101, 102 and 103 delays an inputted evaluation value by an interval of a high speed clock pulse $\phi'$ and then outputs the delayed signal. Accordingly, where an evaluation value $y_{n-2}$ is inputted to an input terminal, the delay flip-flop circuits 101 and 103 output an evaluation value $y_{n-1}$ delayed from the evaluation value $y_{n-2}$ by the interval of the high speed clock pulse $\phi'$, whereas the delay flip-flop circuit 102 outputs an evaluation value $y_n$ delayed from the evaluation value $y_{n-1}$ by the interval of the high speed clock pulse $\phi'$.

The processing circuit 104 receives the evaluation value $y_{n-1}$ from the delay flip-flop circuit 103, the evaluation value $y_{n-2}$ from the input terminal 107 and a constant threshold value $Y_0$ from the threshold value setter 105. The constant threshold value has been suitably preset corresponding to evaluation values $y_1, y_2 \ldots$ by the threshold value setter 105. Based upon the inputted evaluation values $y_{n-1}$ and $y_{n-2}$ and the constant threshold value $Y_0$, the processing circuit 104 executes the operation shown by equation (12) or (13) to output a threshold value $Y_n$.

The comparator 106 compares the evaluation value $y_n$ from the delay flip-flop circuit 102 with the threshold value from the processing circuit 4 to produce a signal indicating that whether the evaluation value $y_n$ is larger than the threshold value or not. For example, when the evaluation value $y_n$ is larger than the threshold value, a high level signal is produced at an output terminal where, as when the former is smaller than the latter, a low level signal is produced.

As above described, by varying the threshold value $Y_n$ with evaluation values $y_{n-1}$ and $y_{n-2}$ earlier than the evaluation value $y_n$, it is possible to more accurately evaluate the evaluation value $y_n$ having a continuous property.

The threshold value set by this method is utilized as the threshold value of such evaluation values as the degree of pattern similarity $\phi$ as well as the pattern strength $\Phi$ in the judging circuits 30 and 31 shown in FIG. 11.

While in the foregoing embodiment, at the time of evaluating an evaluation value $y_n$, a threshold value $Y_n$ was varied in accordance with two evaluation values $y_{n-1}$ and $y_{n-2}$ prior to be evaluation value $y_n$, the threshold value $Y_n$ may be varied with only one evaluation value $y_{n-1}$ or with more than three evaluation values $y_{n-1}, y_{n-2}, y_{n-3} \ldots$. Of course the function relationship among the threshold value $Y_n$ and the evaluation values $y_{n-1}, y_{n-2}, \ldots$ is not limited to that shown in this embodiment.

Further, in this embodiment, the objects to be detected were rods having a circular cross-section, the objects may have other configurations, for example, a hexagonal cross-section. Further, the object may have pin head at one or both ends thereof. In other words, any object having a uniform cross-sectional configuration for a predetermined length can be detected.

As above described, since according to this invention, the similarity of patterns is judged by using two evaluation values of the degree of pattern similarity $\phi$ and the pattern strength $\Phi$, the brightness pattern relating to the configuration of an object being detected can be accurately recognized even in cases where optical environment is poor and the light quantity illuminating the object varies.

Moreover, since the object to be measured is scanned in four discrete directions so as to use an optimum reference pattern for each scanning direction, it is possible to accurately detect objects scattered in all directions irrespective of the position of the source of illumination.

Moreover, it is possible to trace and search an object in the longitudinal direction in accordance with the cross-sectional position thereof. Moreover, as it is judged that a proper rod presents when the distance of tracing and search corresponds to the length of a predetermined section of the object, an accurate judgment can be made even under adverse optical environment or even when rods contact or overlap with each other or scattered randomly.

Furthermore, it is also possible to detect the position of the center of gravity and the direction of the object.

Moreover, at the time of tracing and search, since the threshold value corresponding to an evaluation value is varied in relation thereto, the evaluation value can be correctly evaluated.

What is claimed is:

1. A method of recognizing objects comprising the steps of:

extracting a brightness pattern $A(Ca_1, Ca_2, \ldots Ca_n)$ including n picture image data points from picture image data in a predetermined field of view in which a plurality of objects to be detected are present;

determining an average value $\overline{Ca}$ from said brightness pattern by using an equation $$Ca = \sum_{i=1}^{n} Cai/n;$$

determining a pattern $A'$ ($C'a_1, C'a_2, \ldots C'a_n$) obtained by converting said brightness pattern in connection with a deviation from said average value according to an equation $$C'ai = Cai - \overline{Ca};$$

determining a pattern $A''$ ($C''a_1, C''a_2, \ldots C''a_n$) obtained by normalizing said pattern $A'$ according to an equation $$C''ai = \frac{C'a_i}{\sqrt{\sum_{i=1}^{n}(C'a_i)^2}};$$

preparing a reference pattern B ($Cb_1, Cb_2, \ldots Cb_n$) comprising n picture image data points representing as brightness values the configuration of an object to be detected;

determining a pattern $B'$ obtained by converting said reference pattern B in connection with a deviation from an average value of said reference pattern B;

calculating inner products of said patterns $A''$ and $B'$ and of said patterns $A'$ and $B'$, and identifying said objects by using said products as evaluation values.

2. In method of identifying objects which includes the steps of:

extracting a brightness pattern including a predetermined number n of picture element data which are continuous in a predetermined scanning direction from picture image data in a predetermined field of view in which a plurality of the objects to be identified are scattered;

repeating said extracting step for sequential sets of n picture elements each of which sets is offset from the preceding set by one picture element in said scanning direction; and comparing each of said extracted brightness patterns with a prepared reference pattern representing the brightness of said predetermined number n of picture elements in a cross-sectional direction of said objects;

the improvement, for use where the brightness pattern in the cross-sectional direction of said objects varies in accordance with directions of said objects, comprising:

preparing brightness reference patterns in the cross-sectional direction of said objects which are present in said predetermined field of view, in each of four directions corresponding substantially perpendicularly to the horizontal, vertical, right 45° upper and right 45° lower directions;

extracting brightness patterns in each of four scanning directions of said horizontal, vertical, right 45° upper and right 45° lower directions in said field of view, from said picture image data in said predetermined field of view; and utilizing one of said prepared four brightness reference patterns selected in accordance with the direction of scanning of said brightness pattern as a reference pattern for comparison with said brightness pattern, thereby facilitating the identification of randomly scattered objects.

3. A method of identifying objects comprising the steps of:

preparing a reference pattern representing brightness of a predetermined number of picture elements in a cross-sectional direction of said objects, said reference pattern being picture image data of said objects having a uniform cross-sectional configuration for a length of a predetermined section thereof;

extracting a brightness pattern of a predetermined number of picture elements which are present continuously in an X direction of rectangular coordinates from picture image data in a predetermined field of view in which said objects are present, and repeating said extracting step for sequential such brightness patterns, each such brightness pattern being shifted by one picture element in said X direction with respect to the prior extracted brightness pattern;

detecting an occurrence at which one of said objects is crossed in accordance with said brightness pattern and said reference pattern;

after detecting said occurrence, extracting three brightness patterns along a first scan line position displaced by one picture element in a positive Y direction of said rectangular coordinates with respect to the reference position at which the cross-section of said object is detected, said first brightness pattern being obtained at a position that is displaced by one picture elelment on a negative side of said X direction with respect to said reference position, a second brightness pattern being obtained at a position that is the same as said reference position, and a third brightness pattern being obtained at a position displaced by one picture element on a positive side with reference to said reference position;

selecting that brightness pattern most resembling said reference pattern from among said three brightness patterns;

determining, utilizing said selected brightness pattern, and storing the end position of said crossed object in said positive Y direction processing the negative Y direction in the same manner as in said positive Y direction; and storing the end position of said crossed object in said negative Y direction; and determining a distance between said stored two end positions, and identifying that a proper object is present when said distance corresponds to the length of said predetermined section of said objects.

4. In method of identifying objects which includes the steps of:

preparing a reference pattern representing brightnesses of a predetermined number of picture elements in a cross-sectional direction of objects to be identified, said reference pattern being picture image data of an object having uniform cross-sectional configuration for a length of a predetermined section thereof;

extracting brightness patterns of a predetermined number of picture elements which are present continuously in an X direction of rectangular coordinates from picture image data in a predetermined field of view in which said objects are present, and repeating said extracting step for successive brightness patterns which are respectively shifted by one picture element in said X direction with respect to the prior extracted brightness pattern;

the improvement comprising;

detecting a position of crossing of one of said objects in accordance with said brightness patterns and said reference patterns, such detection requiring that a similarity evaluation value $y_n$ between said brightness pattern and said reference pattern be above a certain threshold value $y_n$;

tracing in a Y direction of said rectangular coordinates a position of crossing said objects by utilizing said detected crossing position as a reference position; and while tracing, resetting said threshold value $Y_n$ as a function in which one or more previously obtained evaluation values $y_n$ are the variables, and wherein said reset threshold value $Y_n$ is smaller than a preset constant threshold value $Y_o$ when said one or more previously obtained evaluation values $y_n$ are larger than said constant threshold value $Y_o$.

5. The method according to claim 1 wherein said identifying comprises determining whether an object is present by comparing said calculated inner products with preset threshold values.

6. A method of recognizing objects comprising the steps of:

extracting brightness pattern including n picture elements from picture image data in a predetermined field of view in which one or more like objects to be detected are present;

determining an average value of said brightness pattern;

determining a pattern A' corresponding to the deviation of said brightness pattern from said average value;

determining a normalized pattern A" obtained by normalizing said pattern A';

preparing a reference pattern B comprising n picture element representing the brightness pattern of an object to be detected;

determining a pattern B' corresponding to the deviation of said reference pattern B from the average value of said reference pattern B;

obtaining a pattern similarity value by calculating the inner product of said normalized pattern A" and said pattern B';

obtaining a pattern strength value by calculating the inner product of said patterns A' and B', and identifying said objects by using said pattern similarity value and said pattern strength value as evaluation values.

7. The method of claim 6 wherein said pattern B' is normalized to obtain a normalized reference pattern B" and wherein said pattern similarity value and pattern strength value are obtained respectively by calculating the inner product of said values A" and B" and the inner product of said values A' and B".

* * * * *